United States Patent
Miller et al.

(10) Patent No.: US 6,507,952 B1
(45) Date of Patent: Jan. 14, 2003

(54) PASSENGER ENTERTAINMENT SYSTEM PROVIDING LIVE VIDEO/AUDIO PROGRAMMING DERIVED FROM SATELLITE BROADCASTS

(75) Inventors: Scott D. Miller, Upland, CA (US); Ralph Phillipp, Huntington Beach, CA (US); Robert Walzer, Yorda Linda, CA (US); Fredrick Fidel, Diamond Bar, CA (US); Curtis J. Larson, Cedar Rapids, IA (US); James L. Bartlett, Cedar Rapids, IA (US); Jay E. Landenberger, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/318,426

(22) Filed: May 25, 1999

(51) Int. Cl.[7] .................................................. H04N 7/18
(52) U.S. Cl. ......................... 725/76; 725/69; 455/3.02; 343/705
(58) Field of Search ............................. 725/75, 76, 69; 455/3.02; 343/765, 705, 797

(56) References Cited

U.S. PATENT DOCUMENTS

| | | | | |
|---|---|---|---|---|
| 4,295,140 A | * | 10/1981 | Frosch et al. ............... | 342/188 |
| 4,369,519 A | * | 1/1983 | Yuuki et al. .................. | 455/60 |
| 4,733,301 A | * | 3/1988 | Wright, Jr. ................... | 348/460 |
| 5,659,322 A | * | 8/1997 | Caille .......................... | 342/188 |
| 5,760,819 A | * | 6/1998 | Sklar et al. ................... | 725/76 |
| 5,790,175 A | | 8/1998 | Sklar et al. ................... | 348/8 |
| 5,801,751 A | | 9/1998 | Sklar et al. ................... | 348/8 |
| 5,990,928 A | * | 11/1999 | Sklar et al. ................... | 725/76 |
| 6,166,610 A | * | 12/2000 | Ramanujam et al. ....... | 333/161 |

OTHER PUBLICATIONS

U.S. patent application S/N 09/085,180 Infiesto et al., Filing date of May 26, 1998.

* cited by examiner

Primary Examiner—Andrew Faile
Assistant Examiner—Scott Beliveau
(74) Attorney, Agent, or Firm—Nathan O. Jensen; Kyle Eppele (57) ABSTRACT

An in-flight entertainment system provides live video/audio programming to passengers and operators over an aircraft video/audio distribution system. The programming signals are derived from satellite broadcast signals that may be in either circular polarized form or linear polarized form. The broadcast signals are collected by two probes and extracted as right and left circular polarized signals. The right and left circular polarized signals are converted into either circular or linear polarized IF signals, and the IF signals are processed by a receiver/decoder unit to produce the live video/audio programming signals.

20 Claims, 5 Drawing Sheets

PASSENGER ENTERTAINMENT SYSTEM PROVIDING LIVE VIDEO/AUDIO PROGRAMMING DERIVED FROM SATELLITE BROADCASTS

BACKGROUND OF THE INVENTION

1. Field of the Invention

The present invention relates generally to in-flight entertainment (IFE) systems, and more particularly to IFE systems that provide on a world-wide basis live video/audio programming to passengers/operators of an aircraft using broadcast signals transmitted in either circular or linear polarized form.

2. Description of the Related Art

Conventional IFE systems that distribute live video/audio programming to aircraft passengers, such as an Airborne Satellite Television System (ASTS) manufactured by the assignee of the present invention, derive the live video/audio programming signals from a direct broadcast satellite (DBS) that transmits broadcast signals in the form of right and left circular polarized RF signals. For example, U.S. Pat. No. 5,790,175, issued on Aug. 4, 1998, entitled "Aircraft Satellite Television System for Distributing Television Programming Derived From Direct Broadcast Satellites," and U.S. Pat. No. 5,801,751, issued on Sep. 1, 1998, entitled "Distribution of Satellite Television Programs to Passengers in an Aircraft when it is out of range of the Satellites," the disclosures of which are incorporated by reference herein, describe an IFE system that provides live television programming derived from signals broadcast by the DIRECTV DBS system.

Conventional IFE systems, however, are limited because they cannot derive live video/audio programming signals if DBS signals are not in the form of right and left circular polarized RF signals. Although DBS systems that provide service within the continental United States broadcast signals in the form of right and left circular polarized RF signals, DBS systems whose service regions lie outside North and South America generally broadcast signals in the form of horizontal and vertical linear polarized RF signals. For this reason, conventional IFE systems are unable to provide live video/audio programming when the aircraft travels outside the continental United States and into regions serviced by these DBS systems.

SUMMARY OF THE INVENTION

An object of the present invention is to provide an IFE system that is capable of deriving video/audio programming signals from satellite broadcast signals transmitted by satellite constellations within any geographical region, so that live video/audio programming may be distributed to aircraft passengers on a worldwide basis.

The IFE system according to the present invention is capable of deriving video/audio programming signals from satellite broadcast signals that are in either circular polarized form or linear polarized form. Consequently, the IFE system of the present invention is capable of receiving live video/audio broadcasts from a variety of DBS service providers around the world, such as STAR CHOICE in Canada, GALAXY Latin America, DIRECTV in the United States, CANAL+in Europe, SHOWTIME in the Middle East, DIRECTV-Japan in Japan, and DIRECPC in the United States, some of which provide satellite broadcast signals in linear polarized form.

More specifically, the IFE system of the present invention consists of an antenna that is disposed on the aircraft and pointed at a satellite or satellite constellation. The antenna is steered based on control signals processed by an antenna controller. The antenna is steered so that it points in the direction of the highest broadcast signal strength that is transmitted by the satellite or satellite constellation. The antenna includes two probes positioned orthogonally relative to one another. The probes extract linear polarized signals received at the antenna and generates signals corresponding to circular polarization by combining the extracted signals in a 90° hybrid combiner. The signals are then supplied to an intermediate frequency (IF) signal generating unit. The IF signal generating unit converts the signals into IF signals corresponding to either the received circular or linear polarized waves based on the polarization and frequency band of the satellite broadcast signals, and the global position and attitude of the aircraft.

The IF signals are decoded by a receiver/decoder to provide video/audio signals corresponding to a plurality of service channels. The video signals for the plurality of channels are routed to a video and audio distribution system on the aircraft that distributes live television, internet uplink service, weather service, office network uplink, electronic mail uplink, and other video services to passengers and operators.

The present invention may be implemented with any in-flight distribution video/audio system, whether it is interactive or not. It is equally applicable to systems where video is shown on overhead or bulkhead monitors wherein each passenger views the same program, and to systems where each passenger has a number of available programs.

Another object of the present invention is to provide a method of deriving video/audio programming signals from satellite broadcast signals from satellite constellations within any geographical region, so that live video/audio programming may be distributed to aircraft passengers on a world-wide basis using this method.

Additional objects, features and advantages of the invention will be set forth in the description of preferred embodiments which follows.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION OF THE PREFERRED EMBODIMENTS

Figure 1:
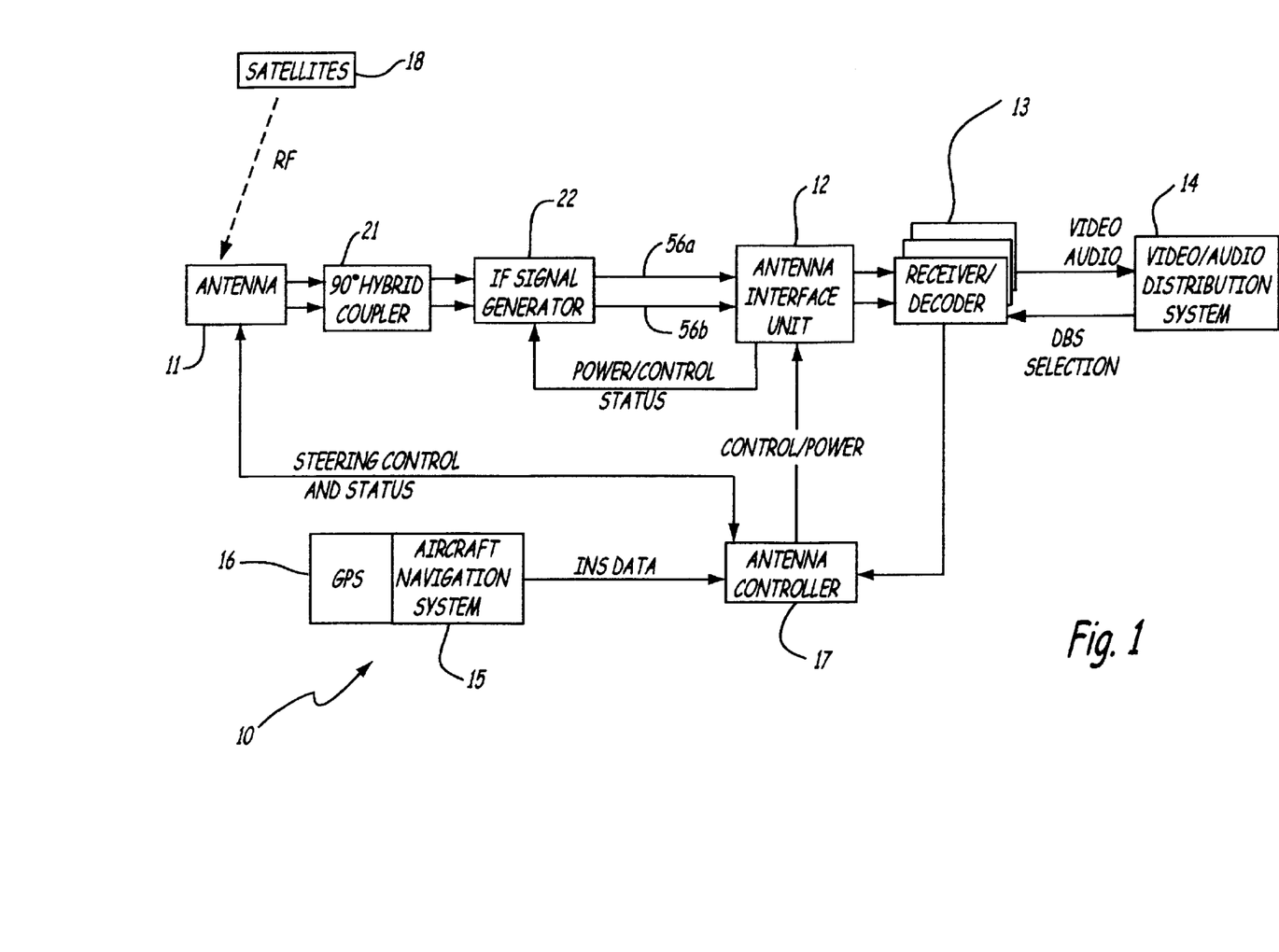
FIG. 1 is a top level block diagram of an IFE system according to the invention.

FIG. 1 illustrates a top-level block diagram of the first embodiment of a vehicle entertainment system 10 of the present invention. The vehicle entertainment system 10 provides live video/audio programming including news, sporting events, movies, and regular commercial programming through a direct broadcast satellite (DBS) 18. It also provides office network services, electronic mail, Internet uplink, videoconference uplink, and weather uplink, et al.

In the description below, the vehicle entertainment system 10 is described as implemented on an aircraft. However, the vehicle entertainment system 10 may be implemented in any vehicle having a passenger entertainment system. Some of the examples include buses, boats, trains, and jetfoils. Also, a description of some of the details of the vehicle entertainment system 10 has been omitted for clarity, and such details may be found in co-pending U.S. patent application Ser. No. 09/085,180, filed May 26, 1998, entitled "Passenger Entertainment System, Method and Article of Manufacture Having Improved Area Distribution Equipment," the contents of which are incorporated by reference herein.

The vehicle entertainment system 10 comprises an antenna 11 that is disposed adjacent the surface of an aircraft, or atop a horizontal or vertical stabilizer of the aircraft. The antenna 11 is steered based on control signals from an antenna controller 17 so that it is pointed at the satellite 18 which is part of an existing DBS system, such as CANAL+, SHOWTIME, DIRECPC or DIRECTV. The operation of the steering control of the antenna 11 is described in U.S. Pat. No. 5,790,175. The antenna 11 may be an electrically steered antenna 11 or a mechanically steered antenna 11.

The antenna 11 includes two linear probes 11a, 11b (see FIG. 3) that collect the satellite broadcast signals, which are typically transmitted in either the C band (3.4 to 4.2 GHz) or the Ku band (10.7 to 12.75 GHz). The linear probes 11a, 11b may be implemented as part of a waveguide circuit or a microwave circuit. The antenna 11 collects two orthogonal linear polarizations which are then supplied to a 90° hybrid coupler or combiner 21. The combiner 21 produces output signals corresponding to right and left circular polarized signals received at the antenna 11. In the case of linear polarization reception, the two outputs of the combiner 21 each contain a portion of the linear signal, depending on the orientation of the antenna probes 11a, 11b relative to the incident wave polarization. The output signals are then supplied to a frequency downconverter or an intermediate frequency (IF) signal generating unit 22. Depending on the DBS service provider, the IF signal generating unit 22 outputs IF signals corresponding to either right and left circular polarized input signals, or horizontal and vertical linear polarized input signals. These IF signals are supplied to an antenna interface unit 12 over a pair of output transmission lines 56a, 56b. In the following discussion, the IF signals may be referred to as circular or linear polarized. However, it is to be understood that this means that the IF signals correspond to circular or linear polarized waves as received at the antenna 11.

The IF signals that are supplied to the antenna interface unit 12 are passed onto and processed by a receiver/decoder 13 which demodulates and decodes the IF signals to provide video and audio signals corresponding to a plurality of channels. The video and audio signals for the various channels are then routed to a conventional video and audio distribution system 14 on the aircraft that distributes video and audio services to the passengers and operators. The receiver/decoder 13 may generate either baseband video and analog audio, or digitally compressed video and audio depending on the nature of the distribution system 14. The method of distributing a large number of live television programs by using digitally compressed video and audio is described in U.S. Pat. No. 5,760,819, the contents of which are incorporated by reference herein.

Multiple receivers/decoders 13 are illustrated in FIG. 1, one for each DBS service provider, because the receiver/decoder 13 must be matched to the provider of the satellite broadcast signals. When the aircraft is flying in a region that is covered by DIRECTV satellites, for example, a matching DIRECTV receiver/decoder must be used to derive the programming signals. The selection among the different DBS service providers may be input manually by an operator of the vehicle entertainment system 10 or generated automatically based on the current global position of the aircraft. In either case, the DBS service selection signal is accomplished by one of the receivers/decoders 13 for generating the video and audio programming signals.

Figure 2:
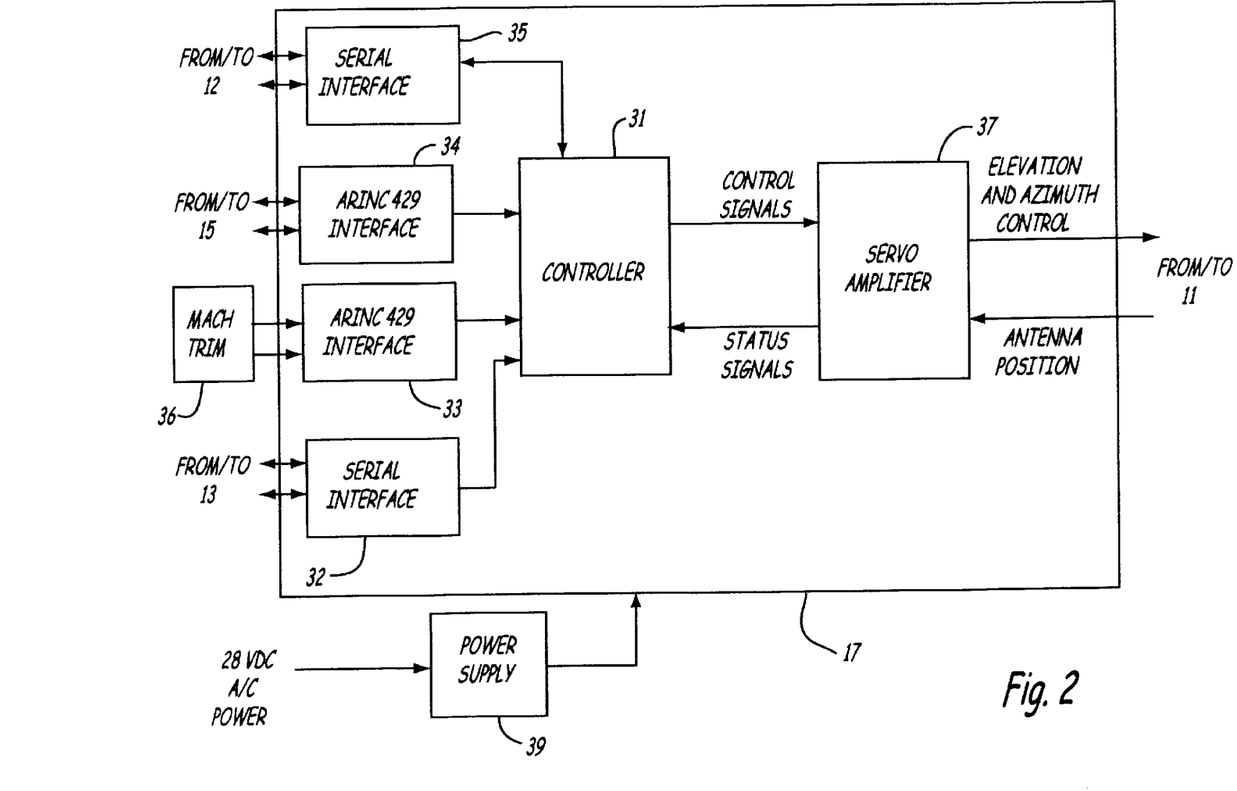
FIG. 2 is a block diagram of an antenna controller employed in the IFE system according to the invention.

FIG. 2 shows a block diagram of the antenna controller 17 employed in the vehicle entertainment system 10 of FIG. 1. The antenna controller 17 comprises a controller 31 that is coupled to two serial interfaces 32, 35, two ARINC 429 interfaces 33, 34, and servo amplifiers 37 for controlling elevation and azimuth angles of the antenna 11. The antenna controller 17 further comprises a power supply 39 that converts 28-volt DC aircraft power into the appropriate DC voltages for the controller 31, the interfaces 32, 33, 34, 35, and the servo amplifiers 37. The controller 31 may be an Intel 486 processor, for example.

The interface 32 couples the antenna controller 17 to the receiver/decoder 13. The DBS service selection signal is supplied from the receiver/decoder 13 through this interface 32. Based on the DBS service selection signal, the controller 31 generates control signals corresponding to the DBS service that is selected. These control signals specify the location of the satellite 18, whether the satellite 18 is broadcasting circular or linear polarized RF signals (circular/linear mode control), the frequency band of satellite transmission, frequency of a local oscillator (LO frequency), and the type of filtering that should be used (filter selection control).

The interface 33 couples the antenna controller 17 to an aircraft mach trim system 36. A trim position of the aircraft's horizontal stabilizer is supplied through this interface 33. This data is used in vehicle entertainment systems where the antenna 11 is mounted on a movable stabilizer, but is not used in vehicle entertainment systems where the antenna is mounted fixed in a relationship to the aircraft body.

The interface 34 couples the antenna controller 17 to the aircraft inertial reference unit or navigation system 15. Inertial reference unit (IRU) signals or inertial navigation system (INS) data corresponding to the aircraft position and attitude are generated by the aircraft navigation system 15 in conjunction with the global positioning system (GPS) 16, and supplied to the controller 31. Based on the INS data, the trim position of the aircraft's horizontal stabilizer (if applicable), the satellite location, and the current antenna position, the controller 31 produces the elevation and azimuth control signals for the antenna 11.

The interface 35 couples the antenna controller 17 to the antenna interface unit 12. A number of different control/status signals are supplied to the antenna interface unit 12 through this interface 35. These signals are control signals for the downconverter and specify whether the satellite 18 is broadcasting circular or linear polarized RF signals (circular/linear mode control), the frequency band of satellite transmission, the LO frequency, and the type of filtering that should be used (filter selection control). The converted DC power is also supplied to the antenna interface unit 12 through this interface 35.

The servo amplifier 37 couples the antenna controller 17 to the antenna 11. The servo amplifier 37 includes an elevation servo amplifier that processes elevation control signals to generate elevation motor drive power that is supplied to the antenna 11, and an azimuth servo amplifier that processes azimuth control signals to generate azimuth motor drive power that is supplied to the antenna 11. The current antenna position is sensed at the antenna 11 and returned to the controller 31 in the form of status signals from the servo amplifiers 37.

Figure 3:
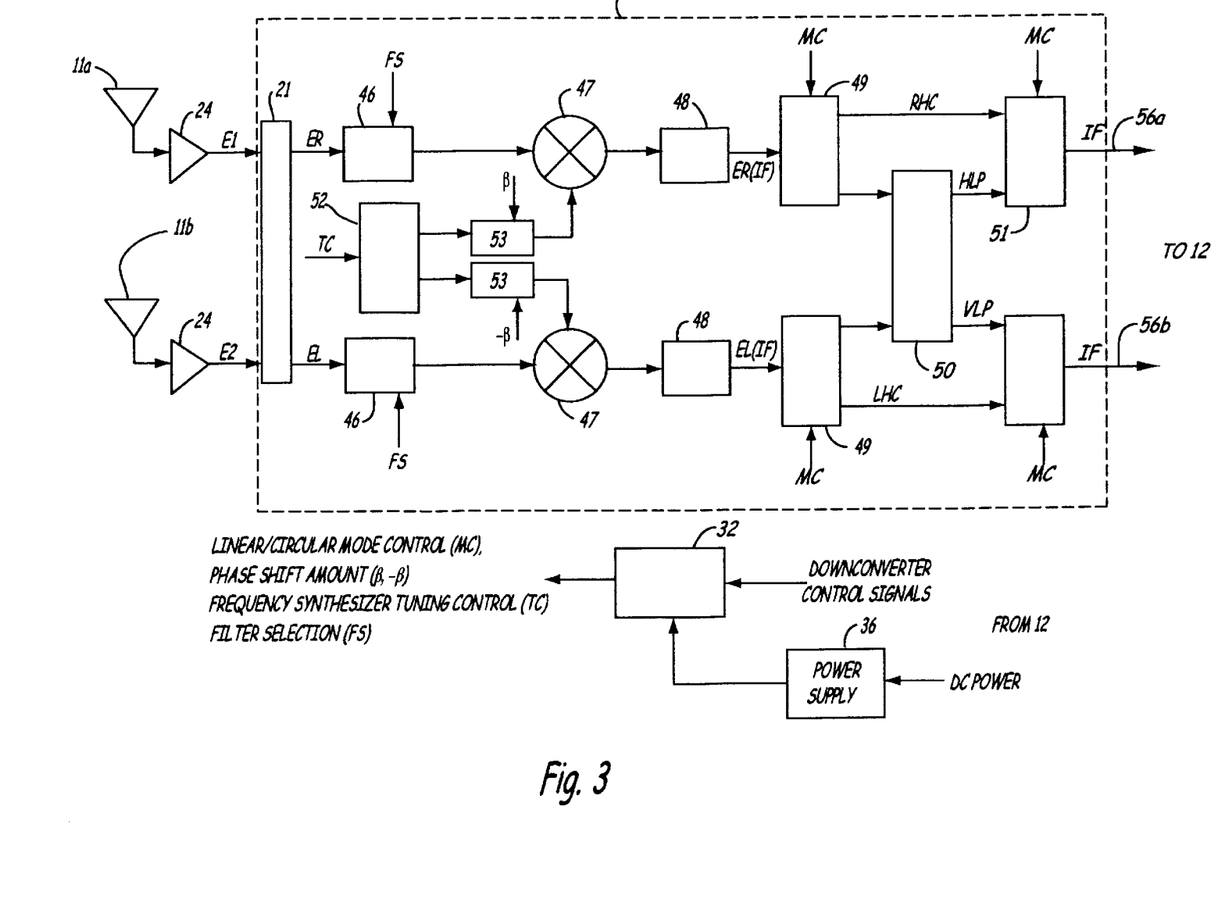
FIG. 3 is a block diagram of antenna probes, a combiner, and a downconverter employed in the IFE system according to the invention.

FIG. 3 shows the frequency downconverter or IF signal generating unit 22 in more detail. The IF signal generating unit 22 includes filters 46, a frequency translator including a pair of mixers 47, filters 48, switches 49, another 90° hybrid coupler or combiner 50, selectors 51, a tunable frequency synthesizer 52, and phase shift circuits 53. The filter 46, mixer 47, and filter 48, and switch 49 operate in the conventional manner, with the exception that the characteristics of the filter 46 may be changed based on filter selection signal FS. The combiner 50 produces horizontal and vertical linear polarized IF signals by combining the appropriately phase-shifted right and left circular polarized IF signals. The selectors 51 selectively pass through either the circular or linear polarized IF signals. The phase shift circuits 53 apply positive and negative phase shift amounts to a local oscillator (LO) signal generated by the frequency synthesizer 52.

FIG. 3 further illustrates the two linear probes 11$a$, 11$b$ that are part of the antenna 11. The linear probes 11$a$, 11$b$ are positioned 90° relative to each other and their output signals are supplied to low noise amplifiers 24 which generate amplified signals E1, E2. The amplified signals E1, E2 are then supplied to the combiner 21 which produces output signals ER and EL according to the formula:

$$ER=(E1+E2\angle-90°)/\sqrt{2} \quad [1]$$

$$EL=(E2+E1\angle-90°)/\sqrt{2} \quad [2]$$

The signals ER, EL are bandpass filtered by the filters 46 and frequency downconverted by the mixers 47 using the LO signal generated by the frequency synthesizer 52. The downconverted IF signals are then low-pass filtered using the filters 48 and passed through switches 49. The switch outputs, RHC and LHC, represent the right and left circular polarized IF signals, respectively, and after passing through the selectors 51, are used directly when receiving circular polarized signals.

When a DBS service provider broadcasting linear polarized signals is used, positive and negative phase shift amounts are added respectively to the LO signal generated by the frequency synthesizer 52 before the LO signal is mixed with the circular polarized signals for frequency downconverting. The operation carried out by the mixers 47 can be expressed as:

$$ER(IF)=ER \times LO\angle+\beta \quad [3]$$

$$EL(IF)=EL \times LO\angle-\beta, \quad [4]$$

where ER(IF) and EL(IF) represent the right and left circular polarized signals in the IF band, respectively. The positive and negative phase shifts have the same magnitude and compensate for the fact that the horizontal and vertical axes of the linear polarized signals broadcast by the satellite 18 are not aligned with the probes 11$a$, 11$b$.

The mixer outputs ER(IF), EL(IF) are supplied to the switch 49, and the switch outputs RHC, LHC are supplied to the combiner 50. The combiner 50 recovers the original linear polarized signals EH and EV at a downconverted frequency, according to the formula:

$$HLP=(ER(IF)+EL(IF)\angle-90°)/\sqrt{2} \quad [5]$$

$$VLP=(EL(IF)+ER(IF)\angle-90°)/\sqrt{2}, \quad [6]$$

where HLP and VLP represent the horizontal and vertical linear polarized signals in the IF band, respectively. The switch outputs RHC, LHC and the combiner outputs HLP, VLP are supplied to the selectors 51. The selectors 51 pass through the circular polarized IF signals, RHC and LHC, or the linear polarized IF signals, HLP and VLP, based on a selector signal or mode control (MC) signal from a logic controller 32 which is provided as part of the IF signal generating unit 22.

The logic controller 32 may be implemented in a microprocessor, a microcontroller, or a fusible programmable gate array, for example. The inputs to the logic controller 32 are the control signals supplied from the antenna controller 17 through the antenna interface unit 12. Based on these control signals, the logic controller 32 generates the appropriate selector signal (MC), filter selection signal (FS), and frequency synthesizer tuning signal (TC), and specifies the amount of phase shift $\beta$ that will compensate for the misalignment between the orientation of the horizontal and vertical axes of the satellite broadcast signals and the orientation of the probes 11$a$, 11$b$.

The selector signal may be either a circular mode control signal or a linear mode control signal. A circular mode control signal is generated when the control signals indicate that the DBS service that has been selected is broadcasting circular polarized RF signals. A linear mode control signal is generated when the control signals indicate that the DBS service that has been selected is broadcasting linear polarized RF signals.

Alternatively, the selector signal may be generated automatically. For example, the logic controller 32, coupled through the antenna controller 17, may be programmed to be responsive to the position of the aircraft, such that when the aircraft is flying through a geographic region that is covered by a DBS service provider that is broadcasting circular polarized signals, the logic controller generates the circular mode control signal, thereby causing the switches 49 and selectors 51 to pass through the circular polarized IF signals, RHC and LHC. Similarly, when the aircraft is flying through a geographic region that is covered by a DBS service provider that is broadcasting linear polarized signals, the logic controller generates the linear mode control signal, thereby causing the switches 49 and selectors 51 pass through the linear polarized IF signals, HLP and VLP, to the decoder 13.

The filter selection signal (FS) is generated for the bandpass filters 46. This signal determines the frequency band that is to be passed through the bandpass filters 46. Similar to the selector signal, the filter selection signal may be generated automatically based on the position of the aircraft.

The frequency synthesizer tuning signal controls the frequency synthesizer 52 to generate the LO signal at a frequency that is necessary to downconvert the signals broadcast by the satellite 18 to the IF band. The frequency of the LO signal is controlled in this manner because signals are broadcast at different frequencies in different regions. It is also highly desirable to map the signal to the same IF used in a given region so that off the-shelf receiver/decoder units for that region can be used. The logic controller 52 generates this tuning signal in accordance with the frequency band of satellite transmission that is specified for the satellite 18 in the downconverter control signals. Similar to the selector signal, the tuning signal may be generated automatically based on the position of the aircraft.

The amount of phase shift β is controlled to be dependent on the orientation of the probes 11a, 11b relative to the orientation of the satellite. The orientation of the probes 11a, 11b is derived based on the aircraft's global position and attitude, the elevation and azimuth positions of the antenna 11, and the satellite's global position. The orientation of the satellite 18 is determined from the position of the satellite 18 as specified in the control signals.

Figure 4:
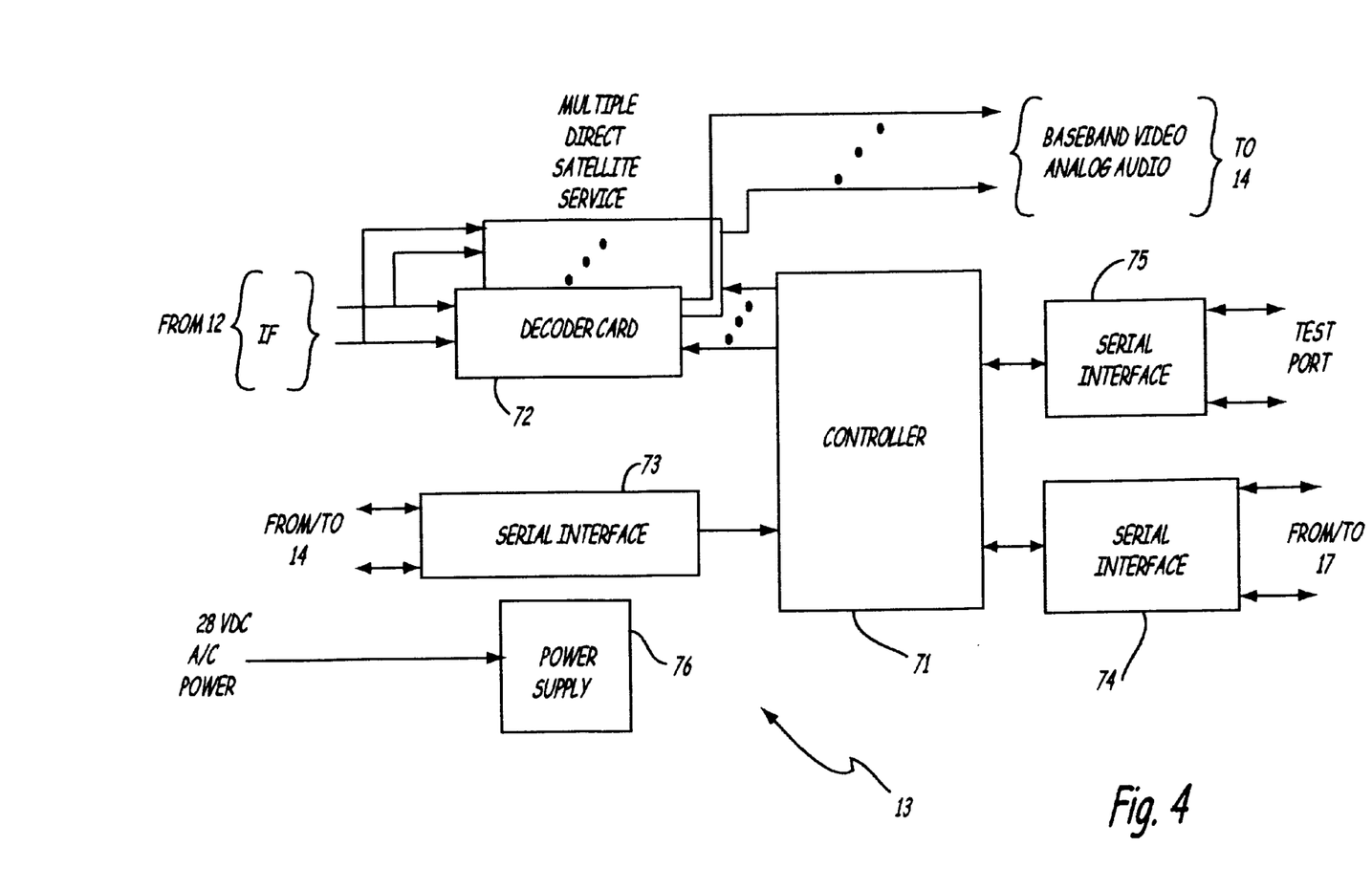
FIG. 4 shows a block diagram of the receiver/decoder 13 employed in the IFE system according to the invention.

FIG. 4 shows a block diagram of the receiver/decoder 13 employed in the vehicle entertainment system 10 of FIG. 1. The receiver/decoder 13 comprises a controller 71 which has a microprocessor or microcontroller, a set of decoder cards 72, each of which correspond to a DBS service provider, a power supply 76, and three serial interfaces 73, 74, 75. The decoder cards 72 contain the electronics and software for demodulating and decoding the IF signals to produce video and audio programming signals in the form of baseband video and analog audio. The baseband video and analog audio are output to the video distribution system 14.

The controller 71 contains the software that generates the DBS service selection signal in response to a DBS service selection made by an operator or user of the vehicle entertainment system 10 and the software with built-in test features for maintaining the antenna 11, the IF signal generating unit 22, the antenna interface unit 12, the antenna controller 17, and receiver/decoder 13.

The serial interface 73 is coupled between the controller 71 and the video/audio distribution system 14. The DBS service selection made by the operator or the user of the vehicle entertainment system 10 is supplied through this interface 73. The serial interface 74 is coupled between the controller 71 and the antenna controller 17. The DBS service selection signal is supplied to the antenna controller 17 through this interface 74. The serial interface 75 is coupled between the controller 71 and a maintenance system (not shown).

Figure 5:
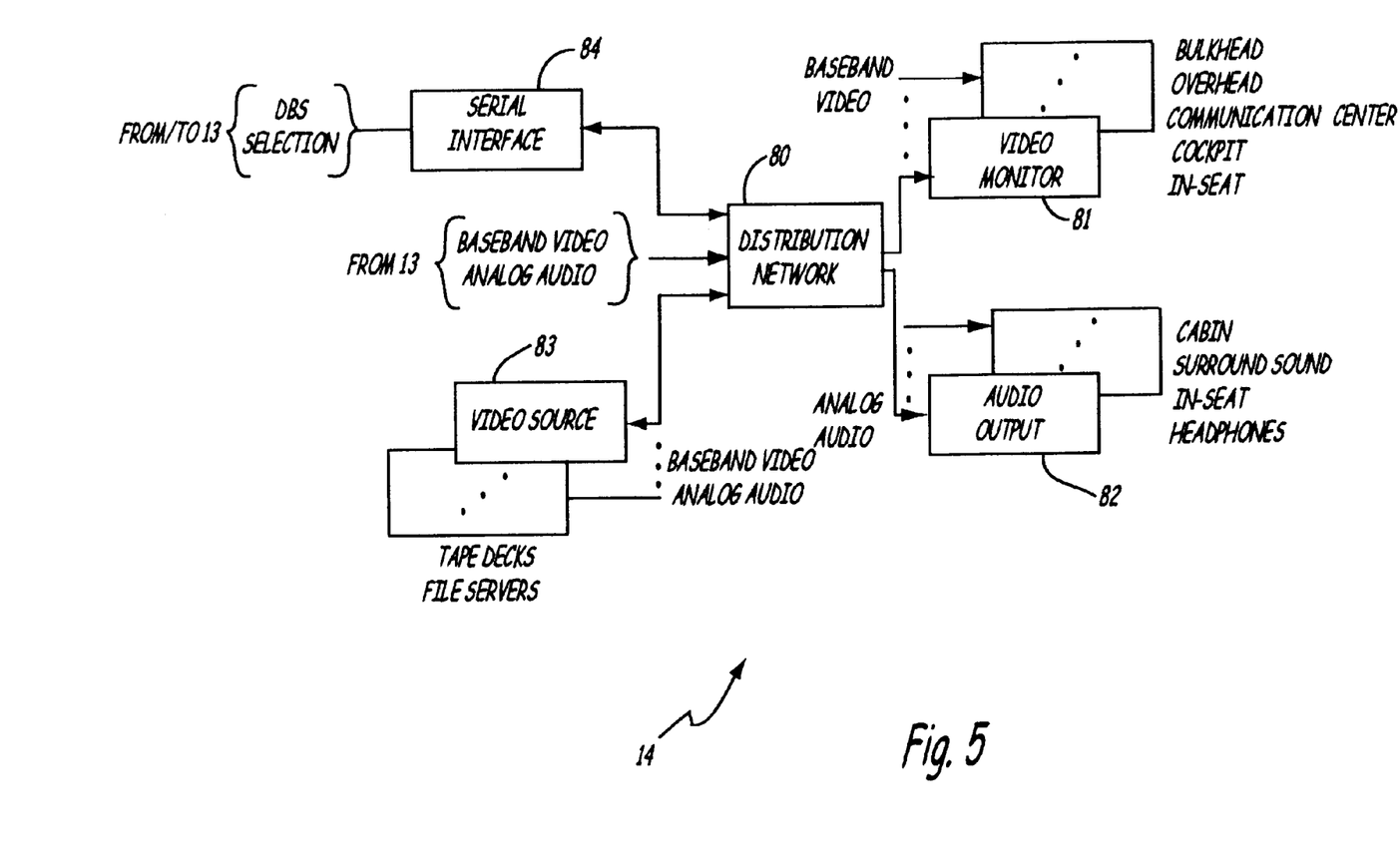
FIG. 5 shows a block diagram of the video and audio distribution system 14 employed in the IFE system according to the invention.

FIG. 5 shows a block diagram of the video and audio distribution system 14 including a distribution network 80. The system 14 provides for distribution of video services to monitors 81, such as monitors in the crew station and cockpit communication center, overhead monitors, bulkhead monitors, in-seat monitors, etc. The system 14 provides for distribution of audio services to audio output devices 82, such as cabin sound systems, surround-sound systems, in-seat systems, headphones, etc.

The baseband video and analog audio signals that are output from the receiver/decoder 13 are supplied to the system 14 through a video and audio interface 80. These signals are in the same format as the taped programming signals generated by video cassette players 83 and in other standard formats. Therefore, video and audio programming from a DBS source can be easily combined with video and audio programming from taped sources, and provide additional programming choices to the passengers.

It is to be understood that the described embodiments are merely illustrative of some of the many specific embodiments that represent applications of the principles of the present invention. Clearly, numerous and varied other arrangements may be readily devised by those skilled in the art without departing from the scope of the invention.

What is claimed is:

1. A vehicle entertainment system that derives programming signals from circular polarized and linear polarized broadcast signals and distributes the programming signals to passengers, comprising:

an antenna for receiving the circular polarized and linear polarized broadcast signals said antenna further comprising linear probes;

a first combiner for producing circular polarized output signals from the circular polarized broadcast signals and producing circular polarized output signals having portions of the linear polarized broadcast signal depending on an orientation of the linear probes to the linear polarized broadcast signals;

a frequency translator for producing circular polarized intermediate frequency (IF) signals from the circular polarized output signals and for applying a phase shift to the circular polarized output signals to produce a phase shifted circular polarized IF signal that compensates for the orientation of the linear probes when receiving linear polarized broadcast signals;

a second combiner for extracting linear polarized IF signals from the phase shifted circular polarized IF signals;

a decoder unit for producing the programming signals from either the circular or linear polarized IF signals; and a signal distribution network for distributing the programming signals to the passengers.

2. The vehicle entertainment system according to claim 1, further comprising:

a logic controller for issuing either a circular mode control signal or a linear mode control signal; and a selector supplied with both the circular and linear polarized IF signals and selectively passing through either the circular or linear polarized IF signals to the decoder unit in accordance with the mode control signal issued by the logic controller, wherein the selector passes through the circular polarized IF signals when the circular mode control signal is issued and the linear polarized IF signals when the linear mode control signal is issued.

3. The vehicle entertainment system according to claim 2, wherein the circular polarized signals and the circular polarized IF signals have right and left components, and wherein the frequency translator includes first and second mixers, the first mixer receiving the right circular polarized signal and a first local oscillator signal to produce the right circular polarized IF signal and the second mixer receiving the left circular polarized signal and a second local oscillator signal to produce the left circular polarized IF signal.

4. The vehicle entertainment system according to claim 3, further comprising a tunable frequency synthesizer for generating a local oscillator signal, wherein the first local oscillator signal comprises the local oscillator signal having a first phase shift amount applied thereto and the second local oscillator signal comprises the local oscillator signal having a second phase shift amount applied thereto.

5. The vehicle entertainment system according to claim 4, wherein the first and second phase shift amounts have the same magnitude and opposite signs.

6. The vehicle entertainment system according to claim 5, wherein the logic controller determines the first and second phase shift amount based on the orientation of the antenna probes in relation to an orientation of a source of the broadcast signals.

7. A vehicle entertainment system, comprising:

means for receiving circular and linear polarized broadcast signals;

means for producing circular polarized output signals from the circular polarized broadcast signals and circular polarized output signals having portions of the linear polarized broadcast signals from the linear polarized broadcast signals;

means for producing circular polarized intermediate frequency (IF) signals from the circular polarized output signals and for applying a phase shift to the circular polarized output signals having portions of the linear polarized broadcast signals to produce linear polarized IF signals;

a decoder unit for producing programming signals from either the circular or linear polarized IF signals; and a network over which the programming signals are distributed to users of the vehicle entertainment system.

8. The vehicle entertainment system according to claim 7, wherein the means for producing circular polarized IF signals includes a frequency translator for producing the circular polarized IF signals from the from the circular polarized output signals and a combiner for extracting the linear polarized IF signals from the circular polarized IF signals.

9. The vehicle entertainment system according to claim 8, further comprising:

a logic controller for issuing a circular mode control signal or a linear mode control signal; and a selector supplied with both the circular and linear polarized IF signals and selectively passing through either the circular or linear polarized IF signals to the decoder unit in accordance with the mode control signal issued by the logic controller, wherein the selector passes through the circular polarized IF signals when the circular mode control signal is issued and the linear polarized IF signals when the linear mode control signal is issued.

10. The vehicle entertainment system according to claim 9, wherein the circular polarized signals and the circular polarized IF signals have right and left components, and wherein the frequency translator includes first and second mixers, the first mixer receiving the right circular polarized signal and a first local oscillator signal to produce the right circular polarized IF signal and the second mixer receiving the left circular polarized signal and a second local oscillator signal to produce the left circular polarized IF signal.

11. The vehicle entertainment system according to claim 10, wherein the frequency translator further includes a tunable frequency synthesizer for generating a local oscillator signal, wherein the first local oscillator signal comprises the local oscillator having a first phase shift amount applied thereto and the second local oscillator signal comprises the local oscillator signal having a second phase shift amount applied thereto.

12. The vehicle entertainment system according to claim 11, wherein the means for receiving comprises an antenna and wherein the logic controller determines the first and second phase shift amounts base on an orientation of the antenna in relation to an orientation of the broadcast signals.

13. The vehicle entertainment system according to claim 7, wherein the means for receiving includes first and second linear probes arranged orthogonally with respect to each other.

14. A method of deriving signals from satellite broadcast signals for distribution to passengers of a vehicle, said method comprising the steps of:

receiving circular and linear polarized satellite broadcast signals with an antenna;

producing circular polarized output signals from the received circular polarized satellite broadcast signals;

producing circular polarized output signals having portions of the of the linear polarized satellite broadcast signals;

producing circular polarized intermediate frequency (IF) signals from the circular polarized output signals;

applying a phase shift to the circular polarized output signals to produce a phase shifted circular polarized IF signal to compensate for an orientation of the antenna;

combining the phase shifted circular polarized IF signals to produce linear polarized IF signals;

selecting either the circular or linear polarized IF signals for decoding;

decoding the selected IF signals into the programming signals; and distributing the programming signals to the passengers.

15. The method according to claim 14 wherein step of applying a phase shift includes the steps of:

generating a local oscillator signal; and applying a positive and a negative phase shift to the local oscillator signal to produce first and second local oscillator signals, respectively.

16. The method according to claim 15, further comprising the step of determining whether the satellite broadcast signals are transmitted in either circular polarized form or linear polarized form, wherein, if the satellite broadcast signals are transmitted in circular polarized form, the circular polarized IF signals are selected, for decoding and, if the satellite broadcast signals are broadcast in linear polarized form, the linear polarized IF signals are selected for decoding.

17. The method according to claim 16, wherein the step of determining includes the step of identifying a satellite service provider who is transmitting the satellite broadcast signals based on a location of the vehicle.

18. The method according to claim 17, wherein the step of decoding includes the steps of selecting a decoder that is matched with the satellite service provider and decoding the selected IF signals into the programming signals using the selected decoder.

19. The method according to claim 17, wherein the step of generating the local oscillator signal includes the steps of determining a frequency band of the satellite broadcast signal transmission based on the identity of the satellite service provider and tuning the local oscillator signal to a particular frequency based on the frequency band of the satellite broadcast signal and a desired IF frequency.

20. The method according to claim 19, further comprising the step of determining an orientation of the antenna relative to an orientation of a source of the broadcast signals, and determining the positive and negative phase shifts based on the relative orientation.

* * * * *